(12) United States Patent
Wijnen et al.

(10) Patent No.: US 9,269,392 B2
(45) Date of Patent: *Feb. 23, 2016

(54) ANTI-COPY PROTECTION FOR A VIDEO SIGNAL

(71) Applicant: DCS COPY PROTECTION LIMITED, Stevenage (GB)

(72) Inventors: Arie Wijnen, Stevenge (GB); Baolin Tan, Stevenage (GB)

(73) Assignee: DCS COPY PROTECTION LIMITED, Steeton, Keighley (GB)

(*) Notice: Subject to any disclaimer, the term of this patent is extended or adjusted under 35 U.S.C. 154(b) by 0 days.

This patent is subject to a terminal disclaimer.

(21) Appl. No.: 14/033,235

(22) Filed: Sep. 20, 2013

(65) Prior Publication Data

US 2014/0023347 A1   Jan. 23, 2014

Related U.S. Application Data

(60) Continuation of application No. 12/463,209, filed on May 8, 2009, now Pat. No. 8,542,980, which is a division of application No. 10/909,918, filed on Aug. 2, 2004, now abandoned, which is a continuation-in-part of application No. PCT/GB03/00450, filed on Feb. 3, 2003.

(30) Foreign Application Priority Data

Feb. 1, 2002  (GB) .................................. 0202384.4

(51) Int. Cl.
*H04N 9/80* (2006.01)
*H04N 5/913* (2006.01)
*G11B 20/00* (2006.01)

(52) U.S. Cl.
CPC .......... *G11B 20/00086* (2013.01); *H04N 5/913* (2013.01); *H04N 2005/91314* (2013.01); *H04N 2005/91357* (2013.01); *H04N 2005/91371* (2013.01)

(58) Field of Classification Search
CPC ............ G11B 20/00086; H04N 5/913; H04N 2005/91357; H04N 2005/91371
USPC .................................. 386/300–305, 252–254
See application file for complete search history.

(56) References Cited

U.S. PATENT DOCUMENTS

| 4,100,575 A | 7/1978 | Morio et al. |
| 4,163,253 A | 7/1979 | Morio et al. |

(Continued)

FOREIGN PATENT DOCUMENTS

| GB | 1 571 386 | 7/1980 |
| WO | WO 88/02588 | 4/1988 |

(Continued)

OTHER PUBLICATIONS

United Kingdom Search Report dated Aug. 9, 2002, GB 0202384.4, 5 pages.

(Continued)

*Primary Examiner* — Gelek W Topgyal
(74) *Attorney, Agent, or Firm* — DLA Piper LLP US

(57) ABSTRACT

An apparatus and method for applying anti-copy protection to a raster-scanned video signal are described. A square waveform 52 is added to the vertical synchronization pulses 50 of the video signal. The effect of the waveform is not apparent until it has been recorded by a video cassette recorder. The anti-copy protected video signal can therefore be viewed normally on a display device at or near to the picture quality intended by the originator of the video signal, but once recorded, exhibits a reduction in picture quality which makes the video signal quite unattractive to view.

17 Claims, 9 Drawing Sheets

(56) References Cited

U.S. PATENT DOCUMENTS

| | | | |
|---|---|---|---|
| 4,571,642 | A | 2/1986 | Hofstein |
| 4,631,603 | A * | 12/1986 | Ryan ............................ 386/201 |
| 4,695,901 | A | 9/1987 | Ryan |
| 4,819,098 | A | 4/1989 | Ryan |
| 4,888,649 | A | 12/1989 | Kagota |
| 5,194,965 | A | 3/1993 | Quan et al. |
| 5,394,470 | A * | 2/1995 | Buynak et al. ................ 380/204 |
| 5,513,260 | A | 4/1996 | Ryan |
| 5,608,799 | A | 3/1997 | Ryan et al. |
| 5,659,613 | A | 8/1997 | Copeland et al. |
| 5,661,801 | A | 8/1997 | Sperber |
| 5,737,417 | A | 4/1998 | Buynak et al. |
| 6,009,172 | A * | 12/1999 | Kurowski et al. ............. 380/218 |
| 6,091,822 | A * | 7/2000 | Mellows et al. .............. 380/210 |
| 6,188,832 | B1 | 2/2001 | Ryan |
| 6,268,889 | B1 | 7/2001 | Koori |
| 6,271,889 | B1 | 8/2001 | Bohm et al. |
| 6,459,795 | B1 | 10/2002 | Quan |
| 6,711,261 | B1 * | 3/2004 | Quan ............................ 380/210 |
| 6,836,549 | B1 | 12/2004 | Quan et al. |
| 6,882,490 | B1 | 4/2005 | Tan et al. |
| 6,956,621 | B2 | 10/2005 | Movshovish et al. |
| 7,236,683 | B2 | 6/2007 | Quan |
| 7,792,293 | B2 * | 9/2010 | Quan ............................ 380/203 |
| 8,542,980 | B2 | 9/2013 | Wijnen et al. |
| 2001/0026617 | A1 * | 10/2001 | Wonfor et al. ................ 380/203 |
| 2002/0018564 | A1 * | 2/2002 | Wonfor et al. ................ 380/210 |
| 2002/0085717 | A1 * | 7/2002 | Quan ............................ 380/218 |
| 2005/0238169 | A1 * | 10/2005 | Quan ............................ 380/206 |
| 2006/0045266 | A1 * | 3/2006 | Wonfor et al. ................ 380/204 |
| 2006/0093326 | A1 | 5/2006 | Tan et al. |
| 2007/0206794 | A1 * | 9/2007 | Wonfor et al. ................ 380/203 |
| 2007/0211898 | A1 * | 9/2007 | Wonfor et al. ................ 380/203 |

FOREIGN PATENT DOCUMENTS

| | | |
|---|---|---|
| WO | WO 96/31878 | 10/1996 |
| WO | WO 99/00977 | 1/1999 |
| WO | WO 01/76240 | 10/2001 |

OTHER PUBLICATIONS

United Kingdom Search Report dated Apr. 27, 2004, GB 0407606.3, 1 page.
International Search Report dated Oct. 20, 2003, PCT/GB03/00450, 5 pages.
Preliminary Amendment dated Aug. 2, 2004, U.S. Appl. No. 10/909,918, 16 pages.
Amendment Before First Office Action dated Dec. 27, 2004, U.S. Appl. No. 10/909,918, 3 pages.
Preliminary Amendment dated Apr. 4, 2005, U.S. Appl. No. 10/909,918, 9 pages.
Restriction Requirement dated Nov. 2, 2007, U.S. Appl. No. 10/909,918 6 pages.
Response to Restriction Requirement dated Dec. 5, 2007, U.S. Appl. No. 10/909,918, 9 pages.
Office Action dated Feb. 22, 2008, U.S. Appl. No. 10/909,918, 10 pages.
Response to Office Action dated Aug. 26, 2008, U.S. Appl. No. 10/909,918, 16 pages.
Final Office Action dated Dec. 11, 2008, U.S. Appl. No. 10/909,918, 11 pages.
Examiner's Interview Summary dated Jan. 22, 2009, U.S. Appl. No. 10/909,918, 2 pages.
Notice of Abandonment dated Jun. 24, 2009, U.S. Appl. No. 10/909,918, 2 pages.

* cited by examiner

ANTI-COPY PROTECTION FOR A VIDEO SIGNAL

CROSS REFERENCE TO RELATED APPLICATION

This application is a continuation of U.S. patent application Ser. No. 12/463,209, filed May 8, 2009, which is a divisional of U.S. patent application Ser. No. 10/909,918, titled "ANTI-COPY PROTECTION FOR A VIDEO SIGNAL", filed on Aug. 2, 2004, which is a continuation-in-part of International Application No. PCT/GB2003/00450, filed Feb. 3, 2003, which claims priority to GB 0202384.4 filed in the United Kingdom on Feb. 1, 2002, all of which are hereby incorporated by reference herein in their entireties.

BACKGROUND OF THE INVENTION

The present application relates to a method and an apparatus for modifying a raster-scanned video signal such that the modified video signal will still be viewable on a display device, such as a television screen, but that following recording of the modified video signal, playback of the recorded modified signal will be adversely affected.

The present application provides a way of preventing unauthorised copying of an original video signal, and may be used, in particular, to deter copying onto tape of Pay-Per-View video signals, and video-to-video (tape-to-tape) copying.

Video piracy is a significant problem for broadcasters and distributors of video signals, since the unauthorised copying and distribution of video recordings by pirates can impact drastically on the revenue generated by a broadcaster or distributor through legitimate sales. It is therefore desirable to prevent video pirates from making unauthorised copies of video signals.

This is best achieved by modifying the original video signal such that when it is recorded the recorded signal cannot be satisfactorily played back.

In known protection techniques, the unauthorised recording of the video signal is made less enjoyable to watch by the interaction of the original signal to which the protection has been applied with the electronic components in either the video cassette recorder or the television receiver itself. For example, making an unauthorised copy of the video signal too dark to be viewed satisfactorily may be achieved by adding to the original video signal a pulse which is significantly larger than that part of the signal which carries the picture information. The position at which the pulse is added depends on the way in which the circuits in the television receiver or video recorder process the signal. When the modified signal is processed by the automatic gain control circuits of a video cassette recorder, the amplitude of the signal is perceived as being that of the added pulse and not that of the portion of the signal carrying the useful information. Consequently, the video cassette recorder or television receiver amplifies the received signal by a smaller factor than if the pulse was not present. As a result of this the information-carrying portion of the signal is not therefore amplified enough to be seen satisfactorily when reproduced.

Such methods have however a number of drawbacks. Methods which rely on the automatic gain control of the video cassette recorder, such as adding a large pulse to the signal, tend to result in a modified signal that cannot itself be viewed on a television through the video channel regardless of whether the signal is being or has been recorded.

An alternative protection technique described in International Patent Application WO 01/76240 involves the removal of a small number of horizontal synchronisation pulses from the blanking section of the signal, so that an unauthorised recording of the signal cannot be properly synchronised by the TV receiver on which it is to be played back. As a result, the resulting picture playback can be poor.

A further technique, disclosed in International Patent Application WO 96/31878, relies on inserting a pulse into the colour burst information portion of the signal section of the signal, such that automatic gain control circuits that rely on the average dc level of the colour burst to determine the necessary amplification of the signal, make such amplification too small. An opposing pulse signal having a magnitude sufficient to offset the change in dc level of the colour burst portion caused by the pulse signal, and optionally a second pulse, are inserted somewhere from the last half of the remainder of the back porch of the signal to the end of the start of the picture information portion.

We have found that this technique can be unreliable in practice, and furthermore has the disadvantage that by inserting a pulse into the colour burst part of the signal, the resulting picture quality is detrimentally affected.

Both of these techniques rely on the components employed in the video cassette recorder or the television receiver, and, in some cases, certain video recorders or television receivers may have an arrangement of components that is not susceptible to the adverse picture effects caused by the modified signal. Thus, the modified video signal can still be played without significant detriment to the picture playback and the anti-copy protection applied to the modified signal is rendered useless.

SUMMARY OF THE INVENTION

The invention is defined by the independent claims below to which reference should now be made. Advantageous features are set forth in the appendant claims.

An apparatus and method for applying anti-copy protection to a raster-scanned video signal embodying the invention are described in more detail below with reference to the drawings. In a first aspect, a square waveform is added to the vertical synchronisation pulses of the video signal. The effect of the waveform is not apparent until it has been recorded by a video cassette recorder. The anti-copy protected video signal can therefore be viewed normally on a display device at or near to the picture quality intended by the originator of the video signal, but once recorded, exhibits a reduction in picture quality which makes the video signal quite unattractive to view.

In a second aspect, a positive-going pulse is added to the back porch of the raster scanned video signal such that it is substantially contiguous with the negative-going horizontal synchronisation pulse. The effect of the pulse is again apparent following recording of the video signal by a video cassette recorder. A negative-going pulse 96 may be added after the colour burst 92 and a further positive-going pulse 98 at the start of the active line 84.

A circumvention apparatus and process are also provided to remove the protection from an anti-copy protected signal.

Other aspects, features and details of the present invention can be more completely understood by reference to the following detailed description of a preferred embodiment, taken in conjunction with the drawings and from the appended claims.

BRIEF DESCRIPTION OF THE DRAWINGS

The invention in a preferred embodiment will next be described in detail, by way of example, and with reference to the drawings in which:

FIG. 6 is a schematic circuit diagram showing a preferred set-top box incorporating apparatus for producing the signal shown in FIGS. 4 and 5a;

DETAILED DESCRIPTION OF THE INVENTION

Figure 1:
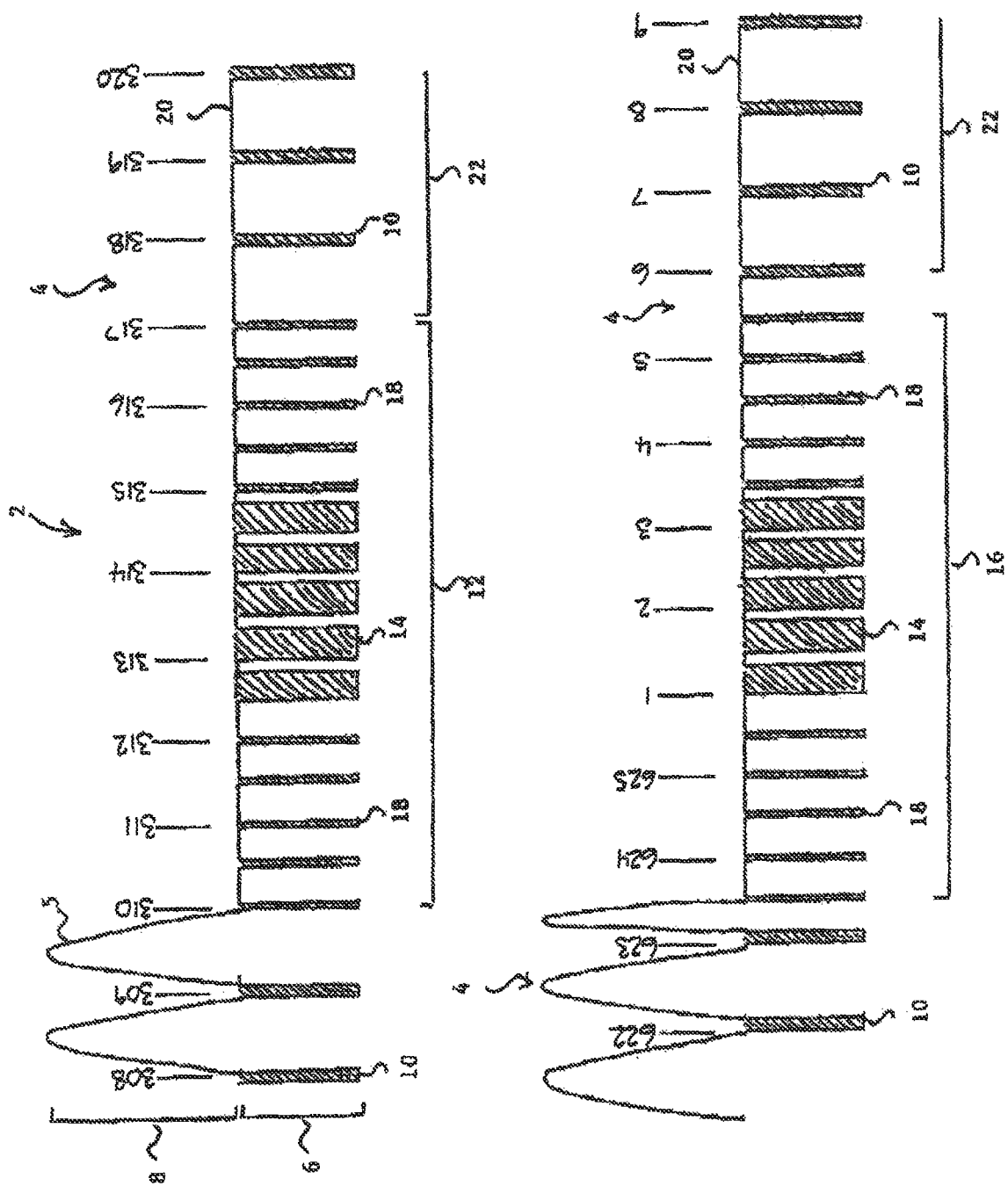
FIG. 1 is an illustration of portions of a typical video picture signal.

FIG. 1 shows part of a conventional raster-scanned video signal 2 for a PAL picture signal. Two blanking regions of the signal are shown with a few picture lines on either side. The upper blanking region shown is at the end of an odd field and the lower one is at the end of an even field.

The picture signal is comprised of 625 lines 4 containing control information 6, such as synchronisation pulses, which are used to configure the response of the television receiver to the signal and ensure generation of a good quality picture, and usually picture information 8. The line numbers 1-9, 308-320, and 622-625 are shown on the figure.

The synchronisation pulses are used to reset the television receiver so that it is ready to display the next line of picture information, following the completion of the previous line (horizontal synchronisation pulses), or following completion of an entire field (vertical synchronisation pulses).

In FIG. 1, each picture information line 5, namely the lines at the left side of the figure, can be seen to comprise picture information 8, shown as a positive going waveform, and a horizontal synchronisation pulse, 10, shown as a negative-going pulse.

Following the lines containing picture information shown at the top-left of FIG. 1, is the vertical blanking region 12 of the signal. This region contains the vertical synchronisation pulses 14 used to control fly-back from the bottom of the television screen to the top once a field or raster of the picture has been displayed.

In a PAL (or NTSC) signal, the picture is generated on the screen in two rasters that are interlaced with each other, and it is therefore necessary to have two blanking regions. These are both illustrated for the PAL signal in FIG. 1.

The first blanking region 12 begins at line 310 of the picture signal and the second blanking region 16 begins at line 623.5. Line 623 of the picture signal therefore contains only a half line of picture information. However, the television receiver is set up such that this line lies outside of the viewable area of the television screen and, like the blanking section, is therefore not viewed. It will be appreciated by those skilled in the art that the lines of the picture signal are numbered consecutively from 1 to 625, and that the signal between the two blanking regions is therefore continuous.

The blanking section itself comprises five negative-going equalisation 18 pulses each of 2.3 .mu.s width, followed by five negative-going vertical synchronisation pulses 14 each of 27.3 .mu.s width, followed by a further five equalisation pulses. The equalisation pulses 18 play a similar role to the horizontal synchronisation pulses 10 and need not be discussed further here as their function is well known to those skilled in the art.

The dc level 20, namely the voltage from which the line synchronisation pulses extend is called the blanking level. This voltage corresponds to the colour black in the picture information.

Following the blanking region there are typically a number of lines 22 of suppressed video information as shown in FIG. 1. These suppressed lines allow room for the transmission of information subsequent to the video information, such as that used in teletext systems.

As discussed above, the vertical synchronisation pulses control vertical fly-back between fields. A television receiver detects the presence of the vertical synchronisation pulses using an integrator circuit. A capacitor in the integrator circuit charges, during each of the synchronisation pulses, and discharges during the spaces in between. The positioning and the duration of the vertical synchronisation pulses is such that the capacitor charges beyond a predetermined threshold that would not be reached due to charging from the narrower horizontal synchronisation pulses or equalisation pulses alone.

Figure 2:
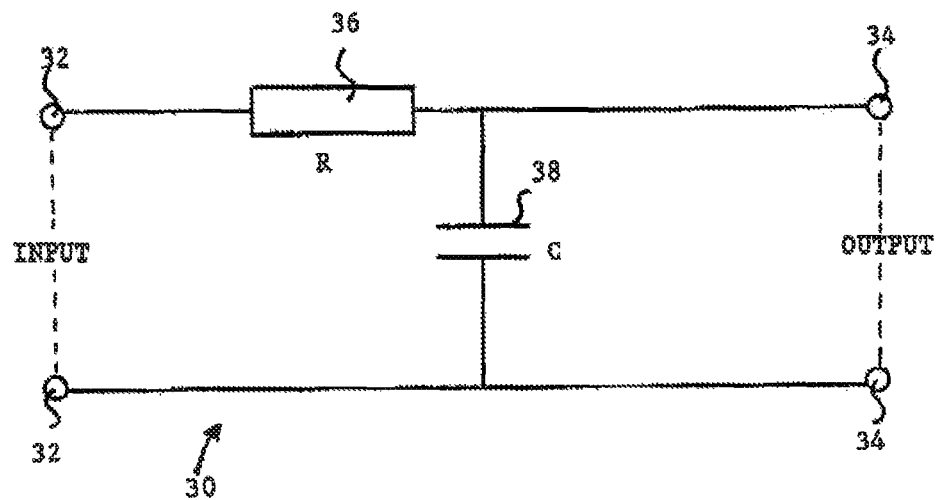
FIG. 2 is an illustration of an example integrator circuit such as that used to detect vertical synchronisation pulses in television receivers.
Figure 3:
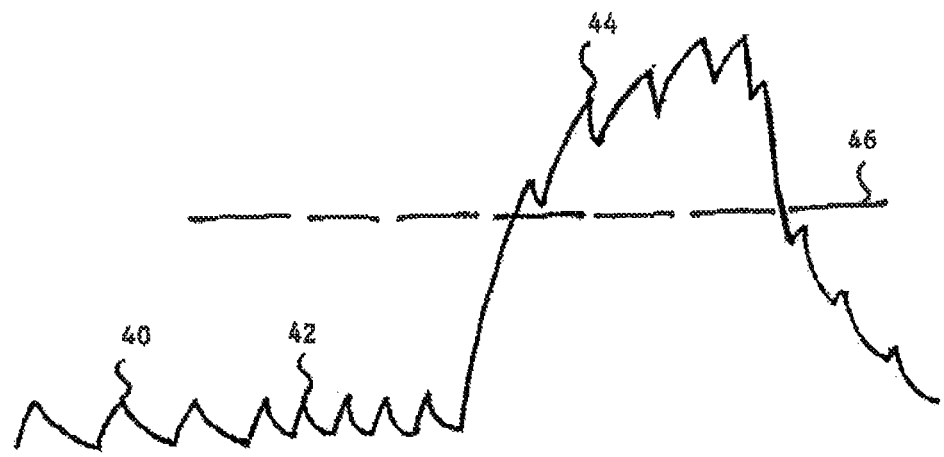
FIG. 3 is an illustration of the voltage output from the example integrator circuit shown in FIG. 2, following the receipt of a conventional vertical synchronisation pulse.

FIGS. 2 and 3 respectively show an example of an integrator circuit and of the voltage across the capacitor as the synchronisation pulses are received.

The integrator circuit 30 shown comprises two input terminals 32 and two output terminals 34. As is well know in the art, a resistor 36 is connected between first input and first output terminals, to form the first stage of the circuit, and a capacitor 38 is connected, after the resistor, across the output terminals to form the end-stage of the circuit.

As horizontal or vertical synchronisation pulses are received at the input terminals, the voltage across the capacitor increases as shown in FIG. 3. The duration of the horizontal synchronisation pulses and equalisation pulses produces only small increases in voltage as shown by peaks 40 and 42 respectively. However the vertical synchronisation pulses produce a much greater increase in voltage, as illustrated by peaks 44, such that the capacitor voltage exceeds a predetermined detection threshold 46. The threshold need not be exceeded after the first synchronisation pulse, as shown in FIG. 3, but will, in normal operation, be exceeded at least by the time the fifth vertical synchronisation pulse is received.

First Aspect of the Invention

In accordance with the first aspect of the invention, a video signal is modified such that it can be viewed on a television screen in the same way as an unmodified signal, but following recording by a conventional Video Cassette Recorder (VCR), subsequent playback of the recorded signal is unwatchable due to poor picture quality. The reduction in the picture quality in particular appears as instability in the vertical hold of the picture causing it to jump and jitter on the screen.

This effect is achieved by adding an additional waveform into the vertical synchronisation pulses of the signal to interfere with the operation described above with reference to FIGS. 2 and 3. As the blanking region is not used to contain picture information there is no loss in picture quality or data capacity of the signal being transmitted, such as might result if any of the active or suppressed picture lines were modified.

Figure 4:
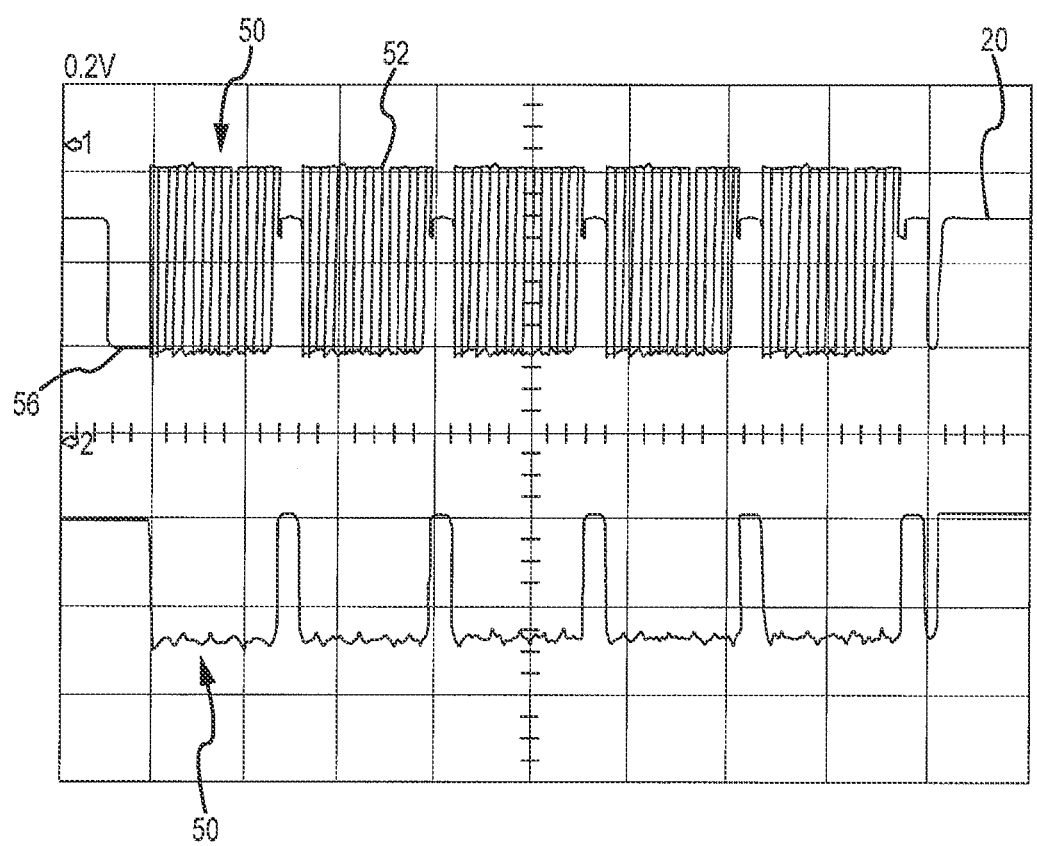
FIG. 4 is an illustration of a modified signal in accordance with the preferred embodiment of the invention.

The top half of FIG. 4, to which reference should now be made, shows vertical synchronisation pulses 50 modified according to the preferred embodiment of the invention. The bottom half of FIG. 4 shows an unmodified signal for comparison. The five negative pulses can be seen to extend downwards from the blanking level 20, and can be seen to have an amplitude of about −300 mV.

The synchronisation pulses shown in the top half of FIG. 4 have been modulated according to the invention to include a waveform 52 with a much shorter period than that of the vertical synchronisation period and which extends above the blanking level. It has been found that this additional waveform may have a frequency in the range 50 kHz to 5 MHz. Preferably, the waveform has a minimum voltage level of −300 mV, namely that of the unmodulated vertical synchronization pulse, to a peak voltage level of around +250 mV, that is above the blanking level. It is thus greater than the amplitude of the vertical synchronising pulses themselves. A waveform with a frequency of 1.1 MHz has been found to produce the best results in practice, though 0.5 to 2 MHz is also an advantageous range. The precise parameters that work best must be found empirically for any particular application. In general, the lower the frequency of the modulation, then the greater its magnitude needs to be, and vice versa.

The presence of the modulation or additional waveform 52 in the modified signal does not have an effect on vertical synchronisation of the picture until it is recorded. This is because the amplitude of the additional waveform is too small before recording to have any significant effect on vertical synchronisation pulse detection. As a result the modified signal may be viewed normally.

However, when the modified signal is recorded by a video recorder, the signal is amplified. As will be appreciated by those skilled in the art, during recording the magnitude of the part of the signal lying below the blanking signal is 'clamped' or limited such that, even after amplification, the amplitude of the negative-going horizontal and vertical synchronisation pulses remains substantially at the synchronisation pulse level, that is the predetermined voltage required to ensure operation of the respective synchronisation pulse detection circuits.

As a result, the signal that is above the blanking level is effectively amplified in relation to the negative part of the signal and therefore takes up a larger proportion of the total amplitude of the signal. In the case of the modified signal, this means that the positive part of the additional waveform is amplified in relation to the negative part.

Figure 5A:
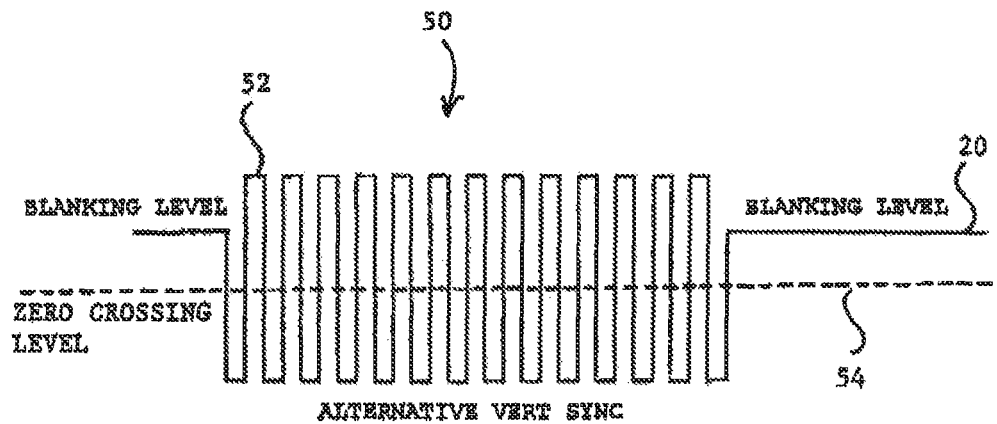
FIGS. 5a and 5b illustrate a single modified vertical synchronisation pulse of the signal shown in FIG. 4 before and after recording.
Figure 5B:
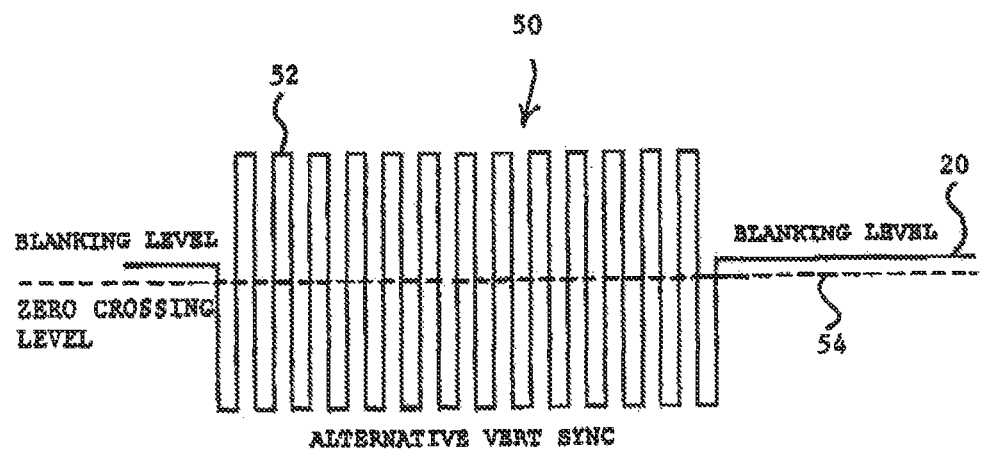

This is illustrated in FIGS. 5a and 5b to which reference should now be made. FIG. 5a shows one vertical synchronisation pulse 50 of a signal modified according to the preferred embodiment of the invention to contain an additional waveform 52, before the signal has been recorded. The blanking level 20 is indicated on the figure, as is the zero-crossing point 54, or average value of the signal.

Preferably, the additional waveform is a square wave, as shown, as this is found after amplification to have a greater effect on the zero-crossing point or average value than a substantially sinusoidal waveform for example. The square wave does not necessarily have to have a duty cycle of 50%. Before recording the positive amplitude of the signal might typically extend to +250 mV.

The amplitude of the additional waveform applied to the vertical synchronisation pulse is not sufficient, before recording, to cause instability in the vertical hold of the picture when viewed, either directly on the television or monitor, or indirectly through the video recorder. However, when the signal is recorded, the part of the additional waveform lying above the blanking signal is amplified in relation to the negative-going synchronisation pulse, which remains clamped at the same amplitude. This is illustrated in FIG. 5b, which shows the signal of FIG. 5a after being recorded.

Depending on the type of video recorder, an initial modulated signal of amplitude +250 mV might be amplified to +500 mV above the blanking level, while the signal below the blanking level remains clamped at an amplitude of −300 mV. As a result, the average level of the signal in the region of the field synchronisation pulses is now less negative than before it was recorded. The zero-crossing point or average value of the signal in the region of the vertical synchronisation pulse is raised, and the capacitor does not charge as rapidly towards the predetermined detection threshold. The television receiver cannot therefore detect the field synchronisation pulses as easily, and the resulting recorded picture, when played-back, will jump and jitter and not be enjoyable to watch.

Depending on the television receiver, the effect of the amplification of the modulation signal in the field synchronisation pulses might be sufficient after just a single recording to result in the television receiver having difficulty detecting the pulses. Nevertheless, each time the modified video signal is re-recorded the amplitude of the modulation signal is amplified in the positive direction, while the negative amplitude of the synchronisation pulse remains clamped and constant. The disruptive effect of the modulation signal therefore becomes worse each time the modified signal is recorded, so that even if a first unauthorised recording can be made, further recordings of the first unauthorised recording are likely to be unwatchable.

The above description is a simplified explanation of the preferred system. It is not for example necessary for the upper part of the additional waveform to be above the vertical blanking level for the protection effect to be encountered. If for example a square wave is added so that its minimum voltage level is below −300 mV, and its maximum voltage level is below zero, then the average voltage for the additional waveform will be less than −150 mV. If the vertical synchronisation pulse containing the additional waveform is then recorded, the synchronisation pulse and the waveform will be amplified. During recording, the minimum level of the pulse will then be clamped at −300 mV effectively discarding that part of the additional waveform with a lower voltage value. As a result, only the higher part of the additional waveform will remain, thereby raising the average voltage level of the synchronisation pulse.

Furthermore, as most recorders boost the higher frequency part of the signal more on recording than the lower frequency part, each time the modified signal is recorded, the high frequency modulation is amplified more than the vertical synchronisation pulse in which it is disposed. The effect of the modulation is therefore made worse with each successive recording.

Referring again to the upper signal illustrated in FIG. 4, it can be seen that in the preferred embodiment of the signal a front porch 56 is added to the signal before the first modulated vertical synchronisation pulse. The front porch shown has an amplitude of −300 mV, i.e. about the same as that of the vertical synchronising pulses, and a width of 10 .mu.s, though a range of 5 .mu.s to 15 .mu.s may be found to be effective, and is found to improve the stability of the un-recorded modified signal when viewed. Certain television receivers have difficulty detecting the vertical synchronisation pulses when they have been modified according to the invention, and as a result jitter during display of the video signal on the television screen can occur even before recording of the signal has occurred. The front porch therefore acts like a single, unmodified vertical synchronisation pulse, and even though its duration is much shorter than typical vertical synchronisation pulses, it has been found just enough to mark the beginning of the blanking signal in which the vertical pulses are contained and aid their detection by such television receivers.

The technique of vertical synchronisation pulse modification described can be used in conjunction with the line synchronisation pulse removal and modulation technique described in International Patent Application WO 01/76240. It has been found that the section of the blanking region in which the line synchronisation pulses have been removed, according to the method disclosed in that patent application, is more frequently mistaken by the television receiver as a vertical synchronisation pulse when the vertical synchronisation pulses are also modified in accordance with this invention such that they are less easily recognised.

The above described techniques for producing an video signal with anti-copy protection have the advantage that the resulting modified signal may be viewed on a television set through the video channel or otherwise, without any disruption to the picture quality. Only when the signal has actually been recorded on a video recorder and is being played-back is the effect on the picture quality realised. This technique has considerable application to pay-per-view broadcasts, in which a broadcaster may, by transmitting a modified picture signal in accordance with the preferred embodiment of the invention, prevent a receiver of the video signals from recording them onto tape. This allows broadcasting companies to broadcast programmes or movies before they are due for release on video, and be sure that any subsequent licensed sales of the programmes or movies on video will be substantially unaffected. As the receiver of the programme cannot record it, the copyright in the programme may be protected.

The vertical synchronisation pulses of both PAL and NTSC signals can be modified in the manner described above.

Figure 6:
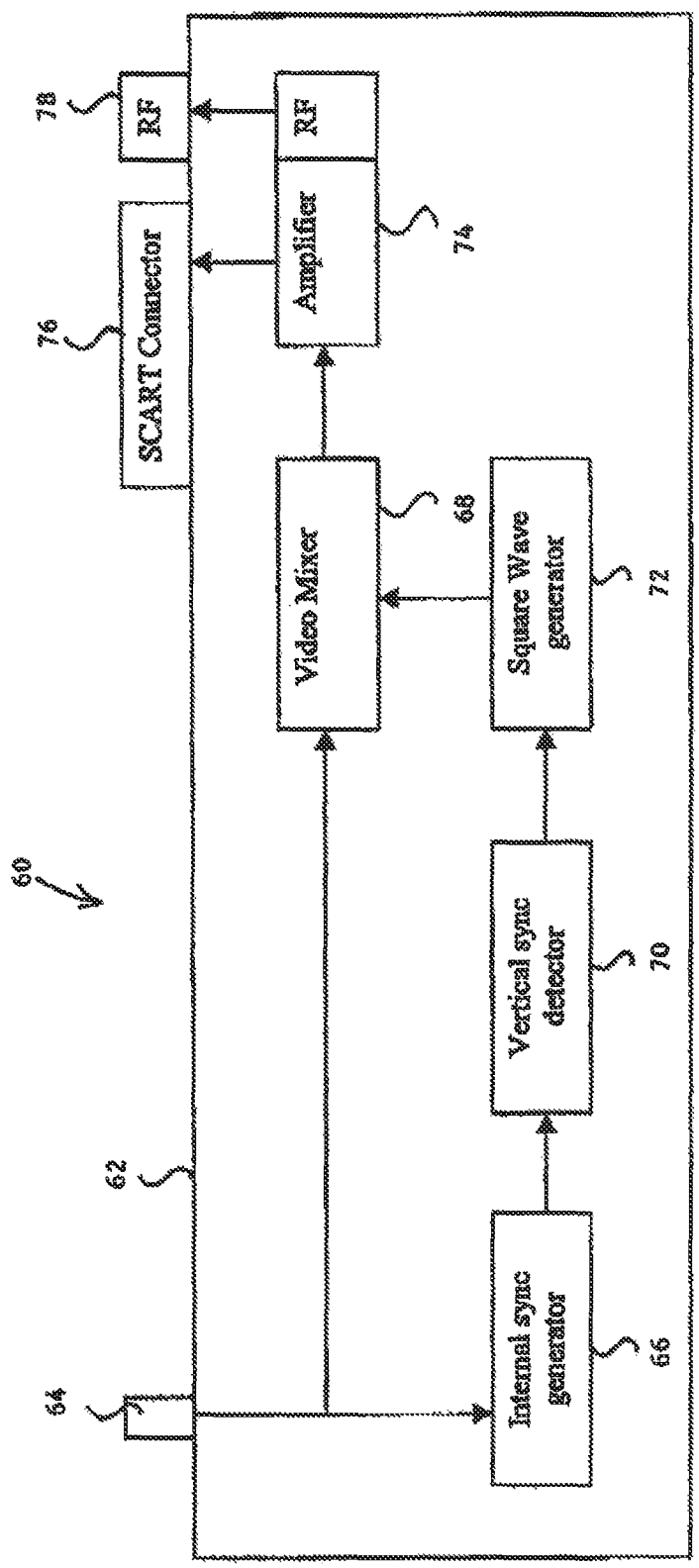

FIG. 6, to which reference should now be made shows a preferred circuit for generating the modified video signal described above. This circuit may be provided as a separate apparatus or, as is more likely, as part of a Pay-Per-View set-top box by cable or satellite broadcasting companies for home use. Other embodiments may also be possible however, such as an apparatus at a broadcaster's transmission site for applying the anti-copy protection before transmission.

The set-top-box 60 shown in FIG. 6 has a housing 62 in which input terminal 64 is mounted. An unmodified video signal is received at the input terminal 64 and is passed to an internal synchronisation generator circuit 66 and to video mixer 68. The synchronisation generator circuit 66 strips the picture information from the received video signal and produces a signal containing just the negative-going horizontal and vertical synchronisation pulses and the equalisation pulses. The 'stripped' signal is then passed to a vertical synchronisation pulse detector circuit 70 which detects the vertical synchronisation pulses of the signal and produces, as an output, a signal containing only vertical synchronisation pulses of the required amplitude of −300 mV. The output signal is next passed to a square wave generator 72. The square wave generator 72 is triggered by the arrival of each vertical synchronisation pulse to produce a square wave of predetermined frequency for the duration of the vertical synchronisation pulse. This square wave is added to the vertical synchronisation pulse in order to produce the desired modulation.

The output of the square wave generator 72 is the combination of the square wave and the vertical synchronisation pulse, which form the modified synchronisation pulse shown in FIG. 5a. The modified signal from the square wave generator is then passed to the mixer 68.

Although a square wave generator has been described with reference to the preferred embodiment, other types of waveform generator could also be employed.

Mixer 68 combines the signal containing the modified vertical synchronisation pulses from the square wave generator 72 and the original signal received from the input 64, such that the unmodified vertical synchronisation pulses of the original signal are replaced by the modified vertical synchronisation pulses. The horizontal synchronisation pulses and the original picture signal remain effectively unaltered in the mixer.

The modified signal is then supplied to an amplifier 74, which amplifies the signal and supplies it to SCART connector 76 or a BNC connector (not shown), or to an RF output terminal 78.

The signal can then be viewed on a television or monitor in the usual way, but is rendered unwatchable when recorded by a VCR.

Although this aspect of the invention has been described with reference to the PAL broadcast television standard, it may also be applied to other broadcast standard signals such as NTSC.

The above described technique cannot be directly used to protect video signals that are to be recorded on video cassettes for distribution. This is because the recording of the original video signal onto any legitimate copies will be subject to the same amplification of the modified vertical synchronisation pulses and any copies will therefore be of a reduced picture quality.

Second Aspect of the Invention

A modified video signal in accordance with the preferred embodiment of the invention, which provides a protection method against video-to-video copying, will next be described with reference to FIGS. 7a, 7b and 7c.

Figure 7A:
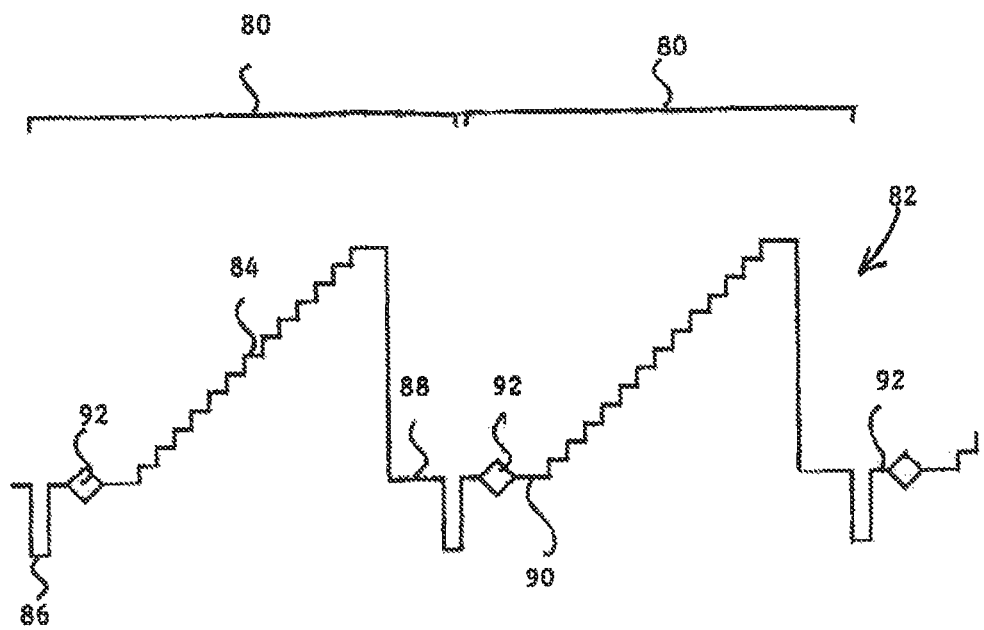
FIG. 7a is an illustration of a number of lines of a known unmodified picture signal.

FIG. 7a shows two adjacent active lines 80 of an unmodified video signal 82. The video signal could be either a PAL or an NTSC signal.

Video information 84 is represented by the stepped waveform ascending from the blanking or black level at its bottom to the white peak level at its top. It will be appreciated that this waveform if viewed on a television screen would be seen as colour bars.

Between the active lines are negative-going horizontal synchronisation pulses 86 which control flyback in the television receiver between successive lines of the video signal. The horizontal region on the left of a horizontal synchronisation pulse 36 is known as the front porch 88, while that on the right is known as the back porch 90. Colour burst information 92, used by the television receiver during demodulation of the chrominance part of the video signal is located on the back porch of the signal on each line and is represented purely diagrammatically by a rhombus or diamond shape.

Figure 7B:
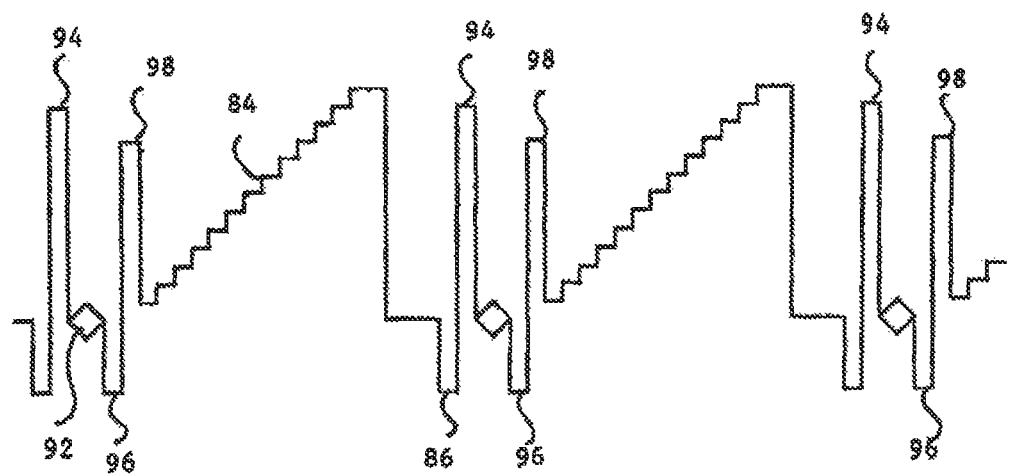
FIG. 7b is an illustration of a modified PAL picture signal according to the second aspect of the invention.

The video signal in FIG. 7b has been modified according to the invention in a preferred embodiment so that it is compatible with PAL television receivers. A signal suitable for NTSC television receivers is described below in relation to FIG. 7c.

The modified PAL signal includes a first additional pulse 94 with a magnitude that is approximately equal to the peak-white level; typically at a level of 1 to 1.2 volts. The first additional pulse is substantially contiguous with the horizontal synchronisation pulse. As shown it is situated directly adjacent to the horizontal line synchronisation pulse. In fact the ascending or right-hand edge of the horizontal synchronisation pulse meets the ascending or left-hand edge of the additional pulse smoothly to form a continuous slope, that is to say that there is substantially no space between the edges of the two pulses.

The presence of the pulse at this location has been found to have an adverse effect on the Automatic Gain Control (AGC) circuits of video recorders. These circuits detect horizontal synchronisation pulses and, based on a determination of their amplitude, amplify the video signal such that it is suitable for recording. The combination of the negative-going horizontal synchronisation pulse 36 and the positive-going additional pulse 94 appears to the automatic gain control circuit as a larger than normal horizontal synchronisation pulse. As a result the amplification provided by the automatic gain control circuit is less than it should be and is insufficient in respect of the rest of the video signal. The recorded signal, when played back later on a television receiver, will be too dark to be satisfactorily viewed. Furthermore it may exhibit stability problems, as the horizontal synchronisation pulses and vertical synchronisation pulses have not been amplified enough to be reliably detected by the circuits of the television receiver.

As mentioned above, it is important for the implementation of this feature that the additional pulse be placed contiguous with the horizontal synchronisation pulse. In particular, the pulse is not placed in the colour burst part of the signal, as this has been found to have an adverse effect on the picture quality while having little or no effect on the automatic gain control circuits.

The amplitude of the pulse 94 is approximately white level, as shown, though it may be that an amplitude above 30% of white level will be sufficient in certain circumstances. The duration of the pulse 94 is between 0.5 and 2 .mu.s and is preferably about 1 .mu.s. If the duration of the pulse 94 is at the larger end of the range, the horizontal synchronising pulse 86 can be moved slightly earlier (to the left) to provide sufficient space.

The presence of the first pulse 94 has however been found to have a detrimental effect on the playability of the modified signal even before unauthorised recording has occurred. This is because the pulse interferes with the detection stage circuits in the television receiver causing the receiver to display the modified signal as a picture that is darker than it should be. In order to compensate for this effect, a second, negative going pulse 96, substantially equal in magnitude to a normal horizontal synchronisation pulse, is preferably added to the signal directly after the colour burst. This additional negative-going pulse has been found to reverse the ill-effect of first pulse 94 on legitimate playback of the original modified signal. The duration of pulse 96 is in the range 1 to 5 .mu.s, and is preferably 1.8 .mu.s.

The presence of second pulse 96 however also makes possible the addition of a third, positive-going pulse 98, located just prior to or at the start of the active video information contained in the signal, and directly next to the negative-going pulse 96. The magnitude of the third pulse is about the same as that of the peak white level, and its duration is in the range 1 to 4 .mu.s, preferably 2 .mu.s.

The third pulse acts in the same way as first pulse 94, by interfering with the operation of the automatic gain control of the video recorder. The combination of the pulses 96 and 98 again appear like a horizontal synchronisation pulse of larger magnitude than an ordinary synchronisation pulse, and therefore interferes with the automatic gain control circuits of the video recorder to add to the effect caused by the first pulse 96. Without second pulse 96, the presence of third pulse 98 is not enough to cause sufficient instability in the recorded signal.

Although in FIGS. 7a and 7b, only active lines of the video signal have been shown, the pulse could be inserted throughout the entirety of the video signal, including the blanking section for example.

Figure 7C:
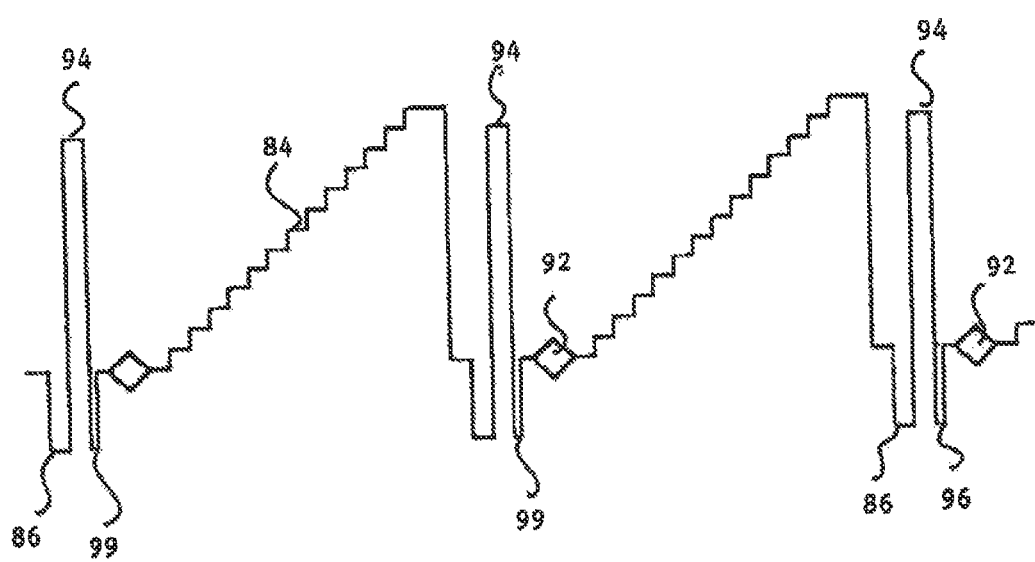
FIG. 7c is an illustration of a modified NTSC picture signal according to the second aspect of the invention.

FIG. 7c shows a video signal modified according to the invention in a second aspect for use with NTSC television receivers. The signal is similar to that shown in FIG. 7b for PAL receivers except that the third pulse 98 is missing and the second pulse is narrower and is located before the colour burst rather than after it. In FIG. 7c, the second pulse is given the reference numeral 99 to make it clear that it is different to the second pulse 96 in the case of PAL transmission. The second pulse 99 has a duration in the range 0.5 to 1.2 .mu.s, and is preferably 0.9 .mu.s. The horizontal synchronisation pulse 86 can be moved slightly earlier if necessary to provide sufficient space for the second pulse 99.

The combination of first pulse 94 and second pulse 99, shown in FIG. 7c, has been found in the case of NTSC receivers to produce a signal that, once recorded by a video cassette recorder, cannot be viewed on a television receiver, but that before recording can be viewed at or near to the picture quality intended by the originator of the video signal. Once again, the presence of second pulse 99 is to undo the darkening effect that the pulse 94 has on playback of the television signal.

The two different signals illustrated in FIGS. 7b and 7c are required to implement the invention because of the different operation of television receivers set up to receive PAL signals and NTSC signals respectively.

Figure 8:
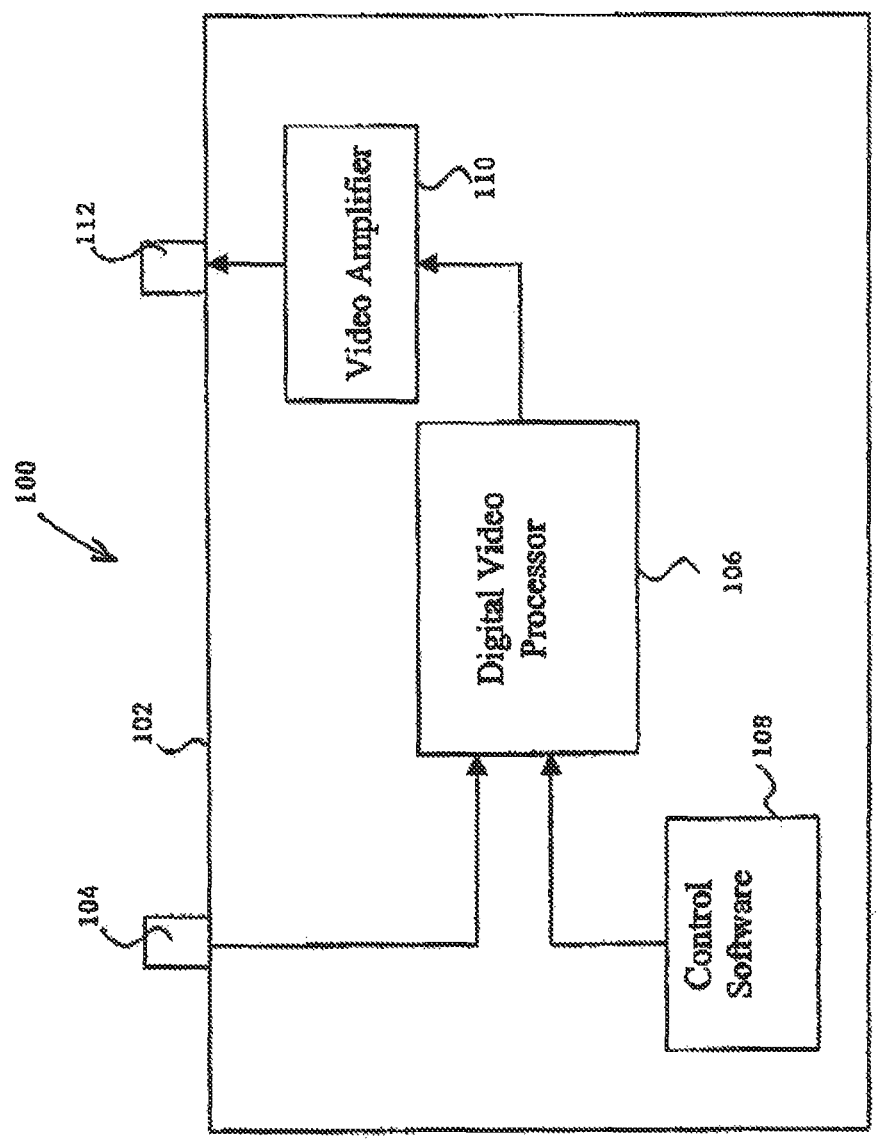
FIG. 8 is a schematic circuit diagram showing the preferred embodiment of apparatus for generating the signal shown in FIG. 7b.

The preferred apparatus for adding pulses 94, 96 and 98 to the video signal is shown in FIG. 8 to which reference should next be made. Preferably this apparatus is made use of by video distributors to add the anti-copy protection described above to the video signal. Both however include the first additional pulses 94.

The apparatus 100 comprises a housing 102 in which an external input 104 is mounted for receiving an unmodified video signal. The signal is passed from the input to a digital video processor 106 controlled by control software 108. The digital processor analyses the received unmodified signal, and under the control of the software 108, adds pulses to the signal in the manner described above. The digital video processor outputs a signal containing the original signal and the additional pulses to video amplifier 110. This amplifies the signal for output to a video output 112 external to the apparatus. The video output thereby supplies a video signal that has been protected against unauthorised copying according to the second aspect of the invention described above. The video distributor can then record this onto a video cassette using a professional video recorder in which the automatic gain control circuit is turned off.

Figure 9:
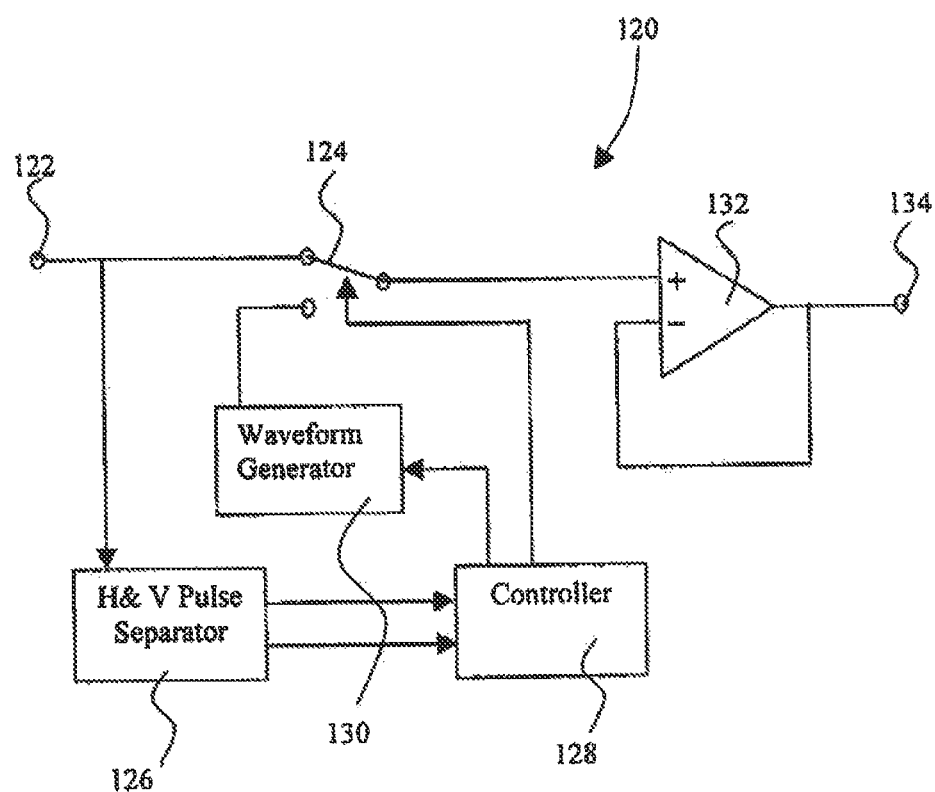
FIG. 9 is a schematic illustration of a circumvention device for removing the protection from a signal protected according to the first or second embodiments.

In addition to the protection methods described above, we have appreciated that it is also desirable to provide a system and method of defeating or circumventing such protection. Thus, a protected signal could be processed to remove the protection and give an unprotected signal that could be copied once again. A circumvention system 120 for doing this is described in more detail in FIG. 9 to which reference should now be made.

A protected signal is first received at input 122. It is then passed to switch 124 and to Horizontal and Vertical Synchronisation Pulse detection circuit 126 respectively. The Synchronisation Pulse detection circuit 126 detects the presence of a vertical or a horizontal sync pulse, and sends a signal to controller 128. The presence of the modifications in the region of the vertical synchronisation pulse should not affect the ability of the detection circuit 126, as at this stage they will not have been recorded. In any case, the time constant of the detection circuit 126 in the circumvention system is preferably smaller than that of the corresponding circuitry in a television receiver. In this way, it may be possible to remove the vertical synchronisation pulse protection from signals which have been copied. The LM1881 chip may for example be used as the Horizontal and Vertical Synchronisation Pulse detector 126, with the SX20 chip used for the controller.

Depending on the output from the synchronisation pulse detection circuit 126, the controller 128 operates the switch 124 to swap between first and a second input. If no synchronisation pulse is detected, the controller 128 selects input 122 supplying the protected signal. As will be recalled from the above discussion, the part of the protected signal away from the synchronisation pulses is not modified in the protection process and can be supplied to the output directly.

If a horizontal synchronisation pulse, or a vertical synchronisation pulse is detected however, the controller 128 selects the second input of the switch, which is connected to signal generator 130. The signal generator 130 provides a signal to overwrite or replace that part of the signal input at 122, which contains the modifications so that the protection is no longer present. In the case of the modified vertical synchronisation pulse, for example, the signal generator 130 preferably provides an unmodified vertical synchronisation pulse, whereas in the case of the horizontal synchronisation pulse, the signal generator preferably provides an unmodified back porch. The timing applied to the switch operation is therefore precisely controlled to ensure that only the previously modified areas of the signal are replaced. For this reason, the signal generator receives an input from the controller 128 ensuring that it is synchronised to the horizontal or vertical synchronisation pulses detected by detector 126. In the case of the modifications to the horizontal line synchronisation pulse, this may mean swapping the switch back to the input signal at the appropriate time to maintain the colour burst in the signal sent to the output.

As mentioned above, the signal generator may simply overwrite the protection modified areas of the signal. In this case, the signal generator 130 may comprise a circuit that gives a controllable, constant output voltage, or a circuit that simply replaces the affected area of the signal with an unaffected area. In this way the vertical synchronisation pulse, or the back porch region may simply be replaced. On the other hand, the removal of the modified areas may comprise addition of a pulse or wave form to cancel that already in place in the signal. In such a case, the signal generator may comprise a square wave generator or pulse generator.

Thus, reconstructing the unprotected signal may involving switching the signal back to its original level at the appropriate time, replacing the modified signal with an unmodified signal, or adding a compensating signal.

The output from switch 124 is then passed to amplifier 132, and finally to output 134. The AD8051 chip may be used as the amplifier.

Although the preferred apparatus and circumvention device have been described with reference to a digital video processor and control software, it will be appreciated that both the control software and the digital control software could be implemented in purpose-built equivalent electronic circuits. Also, although reference has been made throughout this application to a television receiver, it will be understood that any display device on which video signals can be viewed and which operates in a way equivalent to a television receiver to display a raster-scanned signal is included within the scope of the invention. Furthermore, the operation of any apparatus described in this application could be implemented partly or wholly in software as appropriate.

As is known in the art, both positive and negative transmission schemes exist, so called because of the polarity of the signal carrying part of the signal. The schemes described in the application above, by way of example, are positive transmission schemes, and the orientation of the additional pulses as 'positive' or 'negative' reflect this terminology. It will however be appreciated that the invention also has application to negative transmission schemes. In this case, positive going pulses will be negative going pulses, and negative going pulses will be positive going pulses.

Although the present invention has been described with a certain degree of particularity, it is understood the disclosure has been made by way of example, and changes in detail or structure may be made without departing from the spirit of the invention as defined in the appended claims.

What is claimed is:

1. Apparatus for applying anti-copy-protection to a raster-scanned video signal to produce a modified video signal, the apparatus comprising:
   an input for receiving a video signal, the video signal having a vertical synchronisation pulse defined between a leading edge and a trailing edge, wherein the leading edge and the trailing edge are consecutive edges in the video signal;
   circuitry configured to modify the vertical synchronisation pulse between the leading edge and the trailing edge of the video signal received by the input to produce a modified video signal, the modified signal being viewable on a display device at or near to the quality intended by the originator of the video signal but such that after recording by a recording device, the recorded signal exhibits a reduction in vertical stability when played back and viewed on the display device, wherein the circuitry is further configured to modify the vertical synchronisation pulse such that after recording by the recording device, the average voltage level of a modified vertical synchronisation pulse is shifted towards a blanking level in comparison to the average level before recording; and
   an output configured to output the modified video signal.

2. Apparatus according to claim 1, wherein the circuitry is further configured to modify the vertical synchronisation pulse such that a time duration of the vertical synchronisation pulse remains substantially unaltered.

3. Apparatus according to claim 1 wherein the circuitry comprises a waveform generator for adding a waveform to the vertical synchronisation pulse in the video signal received by the input such.

4. Apparatus according to claim 3 wherein the wave form generator is operable to add to the vertical synchronisation pulse a waveform that has a peak level above a blanking level of the video signal.

5. Apparatus according to claim 3 wherein the waveform generator is operable to add a square wave to the vertical synchronisation pulse.

6. Apparatus according to claim 1 wherein the circuitry is further configured to add a front porch to the video signal adjacent to the synchronisation pulse.

7. Apparatus according to claim 6 wherein the front porch has a voltage level substantially equal to that of the vertical synchronisation pulse.

8. Apparatus according to claim 6 wherein the circuitry is configured to modify the vertical synchronisation pulse of the video signal such that after recording by a recording device that amplifies and clamps the video signal, the recorded signal exhibits a reduction in vertical stability when played back and viewed on the display device.

9. Apparatus for applying anti-copy-protection to a raster-scanned video signal to produce a modified video signal, the apparatus comprising:
  an input for receiving a video signal which is to be modified, the video signal having a vertical synchronisation pulse defined between a leading edge and a trailing edge, wherein the leading edge and the trailing edge are consecutive edges in the video signal;
  circuitry configured to modify the vertical synchronisation pulse between the leading edge and the trailing edge of the video signal received by the input to produce a modified video signal, the circuitry adding a waveform to the vertical synchronisation pulse with an amplitude at least equal to that of the vertical synchronisation pulse, wherein the circuitry is further configured to modify the vertical synchronisation pulse such that after recording by a recording device, the average voltage level of a modified vertical synchronisation pulse is shifted towards a blanking level in comparison to the average level before recording, and
  an output configured to output the modified video signal.

10. Apparatus according to claim 9 wherein the waveform has a frequency of at least 5000 KHz.

11. A method for adding anti-copy-protection to a raster-scanned video signal to produce a modified signal, comprising:
  receiving a video signal which is to be modified, the video signal having a vertical synchronisation pulse defined between a leading edge and a trailing edge, wherein the leading edge and the trailing edge are consecutive edges in the video signal;
  modifying the vertical synchronisation pulse of the video signal such that the modified video signal is viewable on a display device at or near to the quality intended by the originator of the video signal, but such that after recording by a recording device, the recorded signal exhibits a reduction in vertical stability when played back and viewed on the display device, wherein modifying the vertical synchronisation pulse further includes modifying the vertical synchronisation pulse such that the average voltage level of a modified vertical synchronisation pulse is shifted towards the blanking level in a comparison to the average level before recording; and
  outputting the modified signal.

12. The method according to claim 11, wherein modifying the vertical synchronisation pulse further includes modifying the vertical synchronisation pulse such that a time duration of the vertical synchronisation pulse remains substantially unaltered.

13. The method according to claim 12 further comprising adding a front porch to the video signal adjacent to the synchronisation pulse.

14. A method for applying anti-copy-protection to a raster-scanned video signal to produce a modified video signal, the method comprising:
  receiving a video signal which is to be modified, the video signal having a vertical synchronisation pulse defined between a leading edge and a trailing edge, wherein the leading edge and the trailing edge are consecutive edges in the video signal;
  modifying the vertical synchronisation pulse of the video signal received by the input to produce a modified video signal, the modifying means adding a waveform to the vertical synchronisation pulse with a frequency of at least 500 KHz and with an amplitude at least equal to that of the vertical synchronisation pulse, wherein modifying the vertical synchronisation pulse further includes modifying the vertical synchronisation pulse such that the average voltage level of a modified vertical synchronisation pulse is shifted towards the blanking level in a comparison to the average level before recording, and
  outputting the modified video signal.

15. The method of claim 14 wherein modifying the vertical synchronisation pulse of the video signal includes modifying the vertical synchronisation pulse such that a time duration of the vertical synchronisation pulse remains substantially unaltered.

16. A method comprising: outputting from an electronic device a raster-scanned video signal having a modified vertical synchronisation pulse defined between a leading edge and a trailing edge of the video signal such that the video signal can be viewed on a display device at or near the quality intended by the originator of the video signal, but such that after recording by a recording device, the recorded signal exhibits a reduction in vertical stability when played back and viewed on the display device, wherein the leading edge and the trailing edge are consecutive edges in the video signal prior to recording, and wherein the modified vertical synchronisation pulse is such that, after recording by the recording device, the average voltage level of a modified vertical synchronisation pulse is shifted towards the blanking level in comparison to the average level before recording.

17. An apparatus comprising: circuitry configured to output a raster scanned video signal having a vertical synchronisation pulse modified to include a waveform with an amplitude at least equal to that of the vertical synchronisation pulse such that a time duration of the modified vertical synchronisation pulse is substantially the same as a time duration of the vertical synchronisation pulse before modification, wherein the vertical synchronization pulse is defined between a leading edge and a trailing edge in the video signal, and wherein the leading edge and the trailing edge are consecutive edges in the video signal before modification, wherein the circuitry is further configured to modify the vertical synchronisation pulse such that after recording by a recording device, the average voltage level of a modified vertical synchronisation pulse is shifted towards a blanking level in comparison to the average level before recording.

* * * * *

UNITED STATES PATENT AND TRADEMARK OFFICE
CERTIFICATE OF CORRECTION

PATENT NO.          : 9,269,392 B2                                              Page 1 of 1
APPLICATION NO.     : 14/033235
DATED               : February 23, 2016
INVENTOR(S)         : Arie Wijnen et al.

It is certified that error appears in the above-identified patent and that said Letters Patent is hereby corrected as shown below:

In the Claims:

Claim 10, column 13, line 2, "5000 Khz" should be --500 KHz--.

Signed and Sealed this
Third Day of May, 2016

Michelle K. Lee
*Director of the United States Patent and Trademark Office*